United States Patent
Huang et al.

(10) Patent No.: US 7,802,000 B1
(45) Date of Patent: Sep. 21, 2010

(54) VIRTUAL NETWORK IN SERVER FARM

(75) Inventors: Xun Wilson Huang, Alameda, CA (US); Gaurav Lochan, Stanford, CA (US); Anupam Dalal, Mountain View, CA (US); Rachit Siamwalla, Sunnyvale, CA (US); James Phillips, Mountain View, CA (US)

(73) Assignee: VMware, Palo Alto, CA (US)

( * ) Notice: Subject to any disclaimer, the term of this patent is extended or adjusted under 35 U.S.C. 154(b) by 1023 days.

(21) Appl. No.: 11/381,119

(22) Filed: May 1, 2006

Related U.S. Application Data (60) Provisional application No. 60/704,548, filed on Aug. 1, 2005.

(51) Int. Cl.
*G06F 12/14* (2006.01)
*G06F 15/16* (2006.01)

(52) U.S. Cl. .................. 709/228; 709/220; 709/226; 455/404.2

(58) Field of Classification Search .............. 709/226, 709/238, 223, 227, 220, 225, 228; 711/154; 455/404.2
See application file for complete search history.

(56) References Cited

U.S. PATENT DOCUMENTS

| | | | |
|---|---|---|---|
| 5,895,467 A * | 4/1999 | Ubell et al. ................. 707/9 |
| 7,093,024 B2 * | 8/2006 | Craddock et al. ........... 709/238 |
| 7,468,659 B2 * | 12/2008 | Haave et al. ........... 340/539.13 |
| 7,516,285 B1 * | 4/2009 | Haynes et al. ............. 711/162 |
| 7,590,737 B1 * | 9/2009 | Chen et al. ................. 709/226 |
| 7,739,541 B1 * | 6/2010 | Rao et al. .................... 714/4 |
| 2005/0228937 A1 * | 10/2005 | Karr et al. .................. 711/6 |
| 2005/0283641 A1 * | 12/2005 | Clark et al. ................. 714/4 |
| 2007/0021100 A1 * | 1/2007 | Haave et al. ............ 455/404.2 |
| 2009/0210866 A1 * | 8/2009 | Troan ........................ 717/168 |

\* cited by examiner

*Primary Examiner*—Khanh Q Dinh (57) ABSTRACT

A plurality of virtual machines execute on a network of physical computers. The virtual machines are deployed in fenced and unfenced configurations across multiple physical computers. Host level virtual network devices execute on the physical computers, and intercept the virtual machine network traffic. For each fenced configuration of virtual machines, a distributed virtual switch transmits network traffic between the virtual machines deployed in that fenced configuration, and a virtual router routes network traffic between virtual machines deployed in that fenced configuration and external components.

35 Claims, 4 Drawing Sheets

VIRTUAL NETWORK IN SERVER FARM

PRIORITY CLAIM AND RELATED APPLICATION

This patent application claims the benefit of provisional application Ser. No. 60/704,548, titled "Virtual Network In Server Farm," filed on Aug. 1, 2005, the entirety of which is hereby incorporated by reference.

TECHNICAL FIELD

This invention pertains generally to virtual computing, and more specifically to one or more virtual networks implemented across multiple physical hosts in a server farm.

BACKGROUND

Virtualization technologies such as VMware and Virtual Server are becoming prevalent in the market place. These technologies provide a virtual hardware abstraction to guest operating systems, and allow them to run as applications (virtual machines) in a functionally isolated environment on a host computer without being modified. Virtualization allows multiple virtual machines (VMs) to run on a single physical server (host computer) simultaneously, providing functional and performance isolation for processor, memory, storage, etc. among the multiple instances of virtual machines.

Isolation and virtualization of networks is an important aspect of virtualization. There are four primary methods of providing such network isolation: 1) each virtual machine can only communicate to the host computer (host only mode); 2) each virtual machine can communicate to the external network via a network address translation (NAT) gateway (NAT mode); 3) each virtual machine can appear as an independent computer on the network (bridged mode); and 4) each virtual machine can talk to other virtual machines on the same computer via an isolated internal network. Each of these methods has its shortcomings.

With host-only mode, a virtual machine cannot communicate to other virtual machines or physical servers on the network. With NAT mode, while a virtual machine can initiate network connection with external servers (virtual and/or physical) on the network, a virtual machine behind a NAT gateway is not externally addressable from outside that gateway. These are severe limitations for virtual machines running in a server farm environment, where it is desirable for many virtual machines to be running on many physical servers.

In bridged mode, virtual machines appear as independent servers on the network and can communicate with one another. While functional as such, bridged mode does not provide any way to isolate a subset of the virtual machines into a separate private network segment. In other words, virtual machines can talk to each other in a flat network segment as individual units, but there is no easy way to create segments containing a subset of virtual machines in a network.

In a server farm environment, it can be very important to create a private network segment, or to overlay a logical network on top of the physical one especially for the virtual machine configurations. For example, it is highly desirable to segregate virtual machine configurations into private networks when, e.g., conducting testing involving viruses, conducting testing with real customer data, or instantiating identical systems on the same physical network for reproducing errant configurations or to perform parallel operations.

Virtual machines can be cloned relatively easily, such that the resulting cloned systems are 100% identical. Cloned systems have identical media access control (MAC) addresses, identical internet protocol (IP) addresses, identical machine names and identical security identifiers (SIDS). This creates conflicts that cause virtual machines and networking equipment such as switches, hubs and routers to malfunction, because MAC addresses are required to be unique in a physical environment.

It would be desirable for a configuration in the form of a group of coordinating virtual machines to be created as a single functional unit, such that virtual machines in the configuration can be deployed onto a server farm, where individual virtual machines in the same configuration can be deployed onto different physical servers. Such a configuration should be cloneable in order to be able create additional identical configurations. It would be desirable for these identical configurations to be able to run simultaneously without causing addressing conflicts.

The desired networking behaviors for the isolated configurations (herein called "fenced configurations") are:

1) Transparency. Within a configuration, virtual machines should be able to communicate with each other unmodified. For instance, virtual machine 1 in configuration 1 should be able to talk to virtual machine 2 in configuration 1 without either virtual machine being modified.

2) Isolation. When two (identical) configurations are deployed at the same time, the two configurations should be functionally isolated from each other. Virtual machines in one configuration should not be able to talk to any virtual machine in another configuration in fence mode.

3) External Access. Virtual machines in a fenced environment should be able to communicate to servers outside the fence via a NAT gateway. For instance, the virtual machine should be able to browse to www.google.com.

4) External Addressability. Servers outside the fence should be able to initiate network connections to virtual machines inside the fence.

Both VMware's ESX product and Ensim's Entrapid product allow construction of virtual networks within a single physical server (this is sometimes called "network-in-a-box"). For example, ESX users can create multiple virtual machines on the same physical server and use a virtual network to interconnect them. With these products, virtual machines in the same network must all reside on the same physical server. This means the target physical server must have ample memory and processing power, which limits the number of active virtual machines that can participate in the private network.

However, the user may want to construct a server farm with a large number of low end physical servers to host a large number of virtual machines. In this case, it may be desirable to form a single network using a subset of these virtual machines that are deployed on different physical servers. In other words, the desired network configuration can span multiple physical machines, and for this construction "network-in-a-box" does not work.

One solution for segregating a physical local area network (LAN) into multiple logical LANs is virtual LAN (VLAN), usually available in high-end managed switches. Unlike normal switches and hubs where all ports are on the same layer two network, VLAN-capable switches allow a subset of ports to form a virtualized LAN, where a switch may contain multiple. VLANs.

There are limitations for using a VLAN-capable switch to implement this solution:

1) Switch-dependency. The system needs to use vendor specific application program interfaces (APIs) to control different switches, which makes integration more difficult.

2) Separate Management Interface. Physical machines in the server farm need to have a separate management interface in addition to the network interface card (NIC) connected to the switch.

3) Price. VLAN-capable switches are more expensive than layer two switches.

4) Unique MAC Address Requirement. Most importantly, switches are built on the assumption that only physical servers with physical NICs are connected to, the switch, where NIC manufacturers guarantee that all NICs have a unique MAC address. This is not the case with virtual machines cloned from virtual machine images. Due to the cloned virtual machines' violation of MAC uniqueness requirements, it is problematic for switches to handle the same MAC address appearing on different ports. Some switches may treat this situation as if a server has been moved from one port to another. Thus, the VLAN technology in managed switches cannot be used satisfactorily to address this problem.

What is needed are methods, systems and computer readable media that provide the above-described desired functionality, without the above-described shortcomings of the existing systems.

SUMMARY OF INVENTION

Computer-implemented methods, computer systems and computer-readable media manage virtual networks. A plurality of virtual machines execute on a network of physical computers. The virtual machines are deployed in fenced and non-fenced configurations across multiple physical computers. Host level virtual network devices execute on the physical computers, and intercept the virtual machine network traffic. For each fenced configuration of virtual machines, a distributed virtual switch transmits network traffic between the virtual machines deployed in that fenced configuration, and a virtual router routes network traffic between virtual machines deployed in that fenced configuration and external components.

The features and advantages described in this summary and in the following detailed description are not all-inclusive, and particularly, many additional features and advantages will be apparent to one of ordinary skill in the relevant art in view of the drawing, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depicts embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Some embodiments of the present invention provide network traffic interception, distributed network switching and virtual routing, in order to instantiate fenced virtual networks across multiple physical hosts in a server farm. Other functionalities such as Address Resolution Protocol (ARP) and setting packet size are also discussed below. In some embodiments of the present invention, network traffic interception is enabled by a host level virtual network device 101 on the host operating system 103, which controls virtual machine 105 network traffic 107, without requiring any modification to virtual machines 105 or guest operating systems 109.

Figure 1:
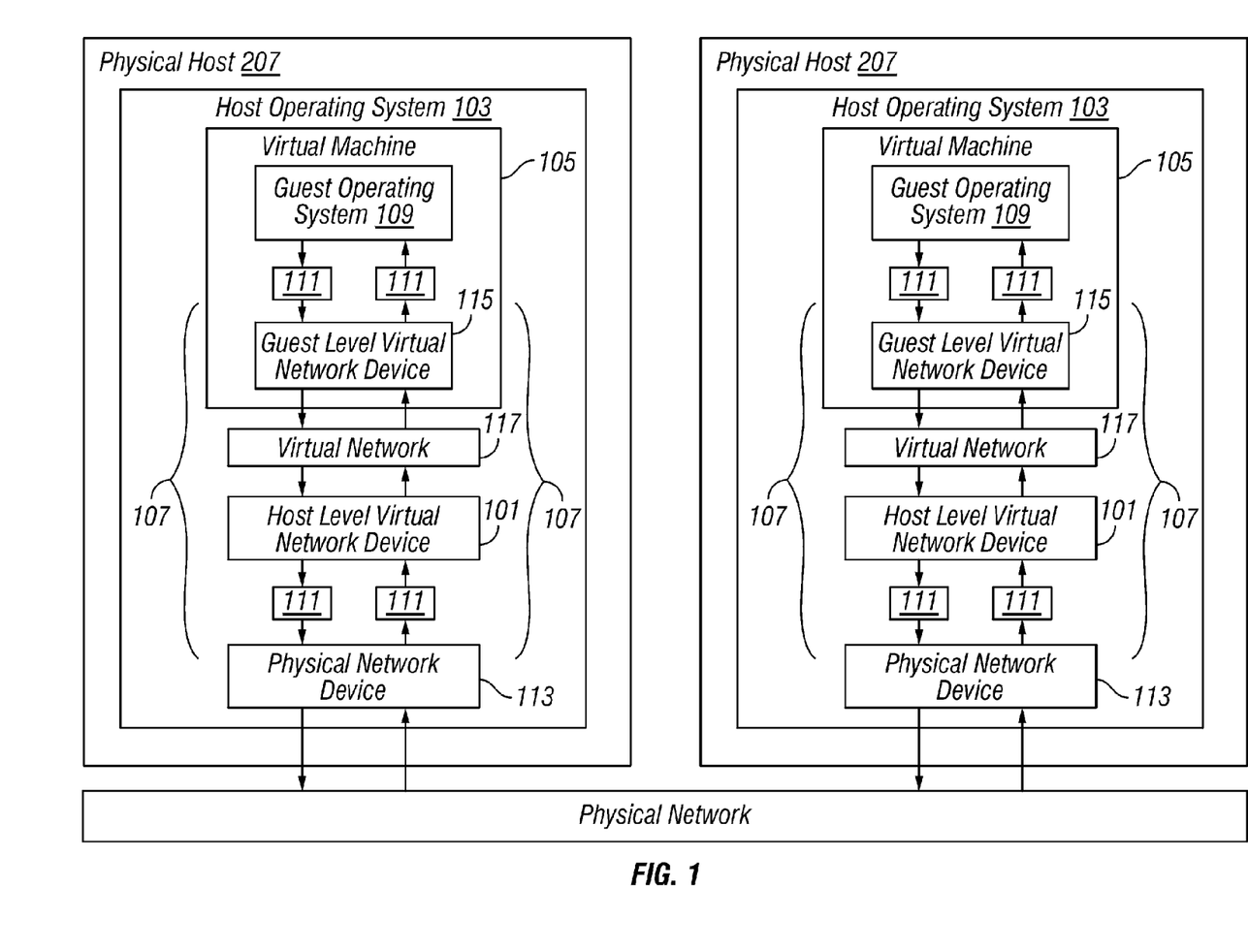
FIG. 1 is a block diagram illustrating a high level overview of the operation of a host level virtual network device, according to some embodiments of the present invention.

FIG. 1 illustrates a host level virtual network device 101, according to some embodiments of the present invention. It is to be understood that although the host level virtual network device 101 is illustrated as a single entity, as the term is used herein a host level virtual network device 101 refers to a collection of functionalities which can be implemented as software, hardware, firmware or any combination of these. Where a host level virtual network device 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the host level virtual network device 101 runs on the host operating system 103, and intercepts virtual machine 105 network traffic 107. The host level virtual network device 101 encapsulates or re-routes packets 111 as desired, without modifying the guest operating system 109 (i.e., the virtual machine environment) or the virtual machine 105 itself. Fences are erected at the direction of the end user, and it would be cumbersome and to require the user to modify the virtual machines 105 every time a deployment occurs.

VMware and Virtual Server both provide a hardware abstraction that maps the physical network device 113 on the host operating system 103 to a guest level virtual network device 115 in the virtual operating system 105. This functionality is leveraged within the context of the present invention to instantiate the host level virtual network device 101. Using Virtual Server as an example, the bindings are as follows:

1) Each virtual machine 105 has one (or more) guest level virtual network device(s) 115;

2) Each guest level virtual network device 115 is connected to a virtual network 117; and 3) Each virtual network 117 can be associated with a physical network device 113 in the host operating system 103.

Network traffic 107 flows from a virtual machine 105, to the virtual network 117, to the physical device 113 and finally to the physical network 119.

In the embodiment of the present invention illustrated in FIG. 1, the network traffic 107 is intercepted by introducing the host level virtual network device 101 in the host operating system 103, with the following properties:

1) The host level virtual network device 101 appears as a "physical" device to the virtualization technology;

2) The virtual network 117 binds to the host level virtual network device 101 instead of to a physical device 113; and
3) The host level virtual network device 101 binds to the underlying physical device 113 and utilizes it to transmit and receive packets 111 after executing the processing described below in the distributed switch section.

As illustrated in FIG. 1, the packet 111 flow involving a host level virtual network device 101 during transmission in the host operating system 103 is as follows:
1) A virtual machine 105 transmits a packet 111 via the guest level virtual network device 115 in the guest operating system 109;
2) The packet 111 reaches the virtual network 117;
3) The packet 111 is sent to the host level virtual network device 101 instead of the physical device 113;
4) The host level virtual network device 101 performs processing (encapsulation); and
5) The host level virtual network device 101 transmits the packet 111 via the physical device 113.

On the receiving end:
1) The packet 111 arrives at physical network device 113;
2) The packet 111 is passed to the appropriate level virtual network device 101;
3) The host level virtual network device 101 performs processing (decapsulation) and passes the packet 111 to the appropriate virtual network 117;
4) The virtual network 117 dispatches the packet 111 to the virtual machine 105; and
5) The packet 111 reaches the virtual machine 105 on the guest operating system 109 via the guest level virtual network device 115.

In one embodiment of the present invention, the host level virtual network device 101 is implemented as a NDIS IM driver on Microsoft Windows®. In another embodiment, it is implemented as a kernel module that implements the IF interface on Linux. Of course, these are only implementation examples, and the host level virtual network device 101 can be implemented in other ways in other embodiments.

Figure 2:
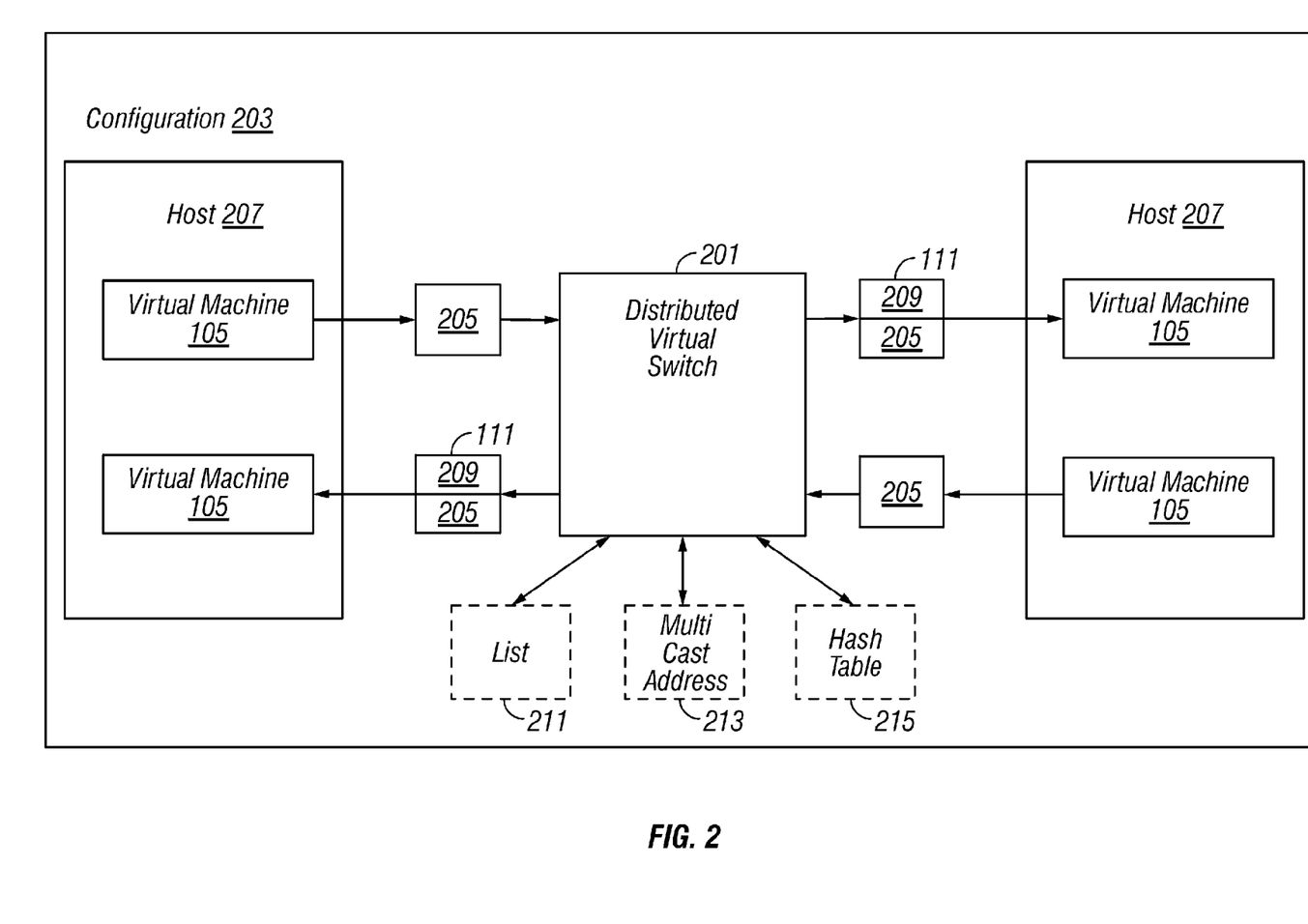
FIG. 2 is a block diagram illustrating a high level overview of the operation of virtual switching, according to some embodiments of the present invention.

With network traffic 107 interception providing control over virtual machine 105 packet 111 flow as explained in conjunction with FIG. 1, the next function points to address are: 1) network functional isolation between independent fenced configurations 203; and 2) network transparency for virtual machines 105 within a given configuration 203. As illustrated in FIG. 2, these functionalities can be enabled by a distributed switch 201.

The distributed switch 201 provides network isolation by encapsulating raw network frames 205 (e.g., raw Ethernet packets) originating from virtual machines 105 in an "envelope," and delivering the encapsulated packets 111 to all relevant hosts 207 on which virtual machines 105 are deployed. The distributed switch 201 is responsible for transmitting packets 111 within the boundary, and only within the boundary, of a given fenced configuration 203. Various approaches are possible and are discussed below.

Multiple configurations 203 each made up of multiple virtual machines 105 can be deployed on a single or on multiple physical server(s) 207. At a network level, the switch 201 segregates the traffic 107 for virtual machines 105 deployed in fenced mode, by encapsulating their raw packets 205 with a header 209.

In one embodiment of the present invention, the header 209 is 16 bytes in length, and of the format depicted in Table 1. It is to be understood that other headers 209 lengths and formats are possible, and are of course within the scope of the present invention. The order, length and exact contents of the fields illustrated in Table 1 and described below are simply an example of one specific implementation according to one embodiment.

TABLE 1

| Header | | | | Standard Frame from VM |
|---|---|---|---|---|
| 6 Bytes Destination MAC Address | 6 Bytes Source MAC Address | 2 Bytes Type/Length (0x88:DE) | 2 Bytes Fragmentation Header | Payload |

According to the embodiment of Table 1, the header 209 fields contain the following information. The Destination MAC Address field comprises the MAC address of the physical server 207 on which the destination virtual machine 105 is deployed. The Source MAC address field comprises an indication of the source of the packet 111. In one embodiment, three specific bytes (e.g., the first three bytes) contain a proprietary registered Organizational Unique Identifier (OUI) which is fixed for all encapsulated packets 111 (e.g., to the sequential hexadecimal values 0x00, 0x13 and 0xF5). In that embodiment, another specific byte comprises an installation identifier, which identifies a relevant installation of a system configured according to the present invention. A single site can have one or multiple installations. Another specific byte comprises a fence identifier, which identifies the specific deployed configuration 203 from which the packet 111 originated (recall that a single configuration 203 typically includes multiple virtual machines 105). Another specific byte comprises a host identifier, which identifies the originating physical server 207.

The Type/Length field comprises a proprietary registered EtherType (e.g., 0x88:DE) which is used by the physical network device 113 to de-multiplex incoming packets 111 to an appropriate host level virtual network device 101, as opposed to a physical network device 113. The Fragmentation Header field is discussed in detail in the MTU section of this specification. The Raw Packet comprises the original network frame 205 from the virtual machine 105, which comprises the payload of the encapsulated packet 111.

When a virtual machine 105 sends a packet 111, the entire raw frame 205 is intercepted by the host level virtual network device 101. The host level virtual network device 101 prepends the header 209 on the packet 111, with the host identifier and installation identifier indicating the physical server 207 on which the virtual machine 105 is running. Depending upon in which configuration 203 the virtual machine 105 is deployed (i.e., the configuration 203 from which the packet 111 originated, and hence to which it is restricted), the host level virtual network device 101 sets the appropriate fence identifier. The encapsulated packet, which is a valid network packet 111 (e.g., an Ethernet packet), is passed to the physical network device 113 for transmission.

On the receiving end, when a packet 111 is received at the physical layer with the appropriately set EtherType value, the packet 111 is sent to the local host level virtual network device 101, which can drop packets 111 with non-matching installation identifiers. The host level virtual network device 101 extracts the fence identifier from the header 209. If a virtual network 117 with the fence identifier exists, the host level virtual network device 101 strips off the header, and passes the packet to the appropriate virtual network 117. Virtual machines 105 in different configurations 203 are isolated via different fence identifiers in the receiving path, and packets 111 with different fence identifiers are de-multiplexed to different virtual networks 117.

The distributed switch 201 is responsible for delivering packets 111 from a virtual machine 105 in a fenced configuration 203 on a physical host 207 to the relevant (and only the relevant) virtual machines in the same fenced configuration 203, on different physical hosts 207. Packets 111 should never be delivered to a virtual machine 105 in a different fenced configuration 203 (whether on the same physical host 207 or otherwise).

There are various functional solutions for the distributed switch 201. It is to be understood that although the distributed switch 201 is illustrated as a single entity, as the term is used herein a distributed switch 201 refers to a collection of functionalities which can be implemented in various ways. One implementation solution for the switch 201 is to broadcast packets 111. In this mode, the host level virtual network device 101 performs a network (e.g., Ethernet) broadcast when sending packets 111. An Ethernet broadcast is executed by setting the destination Ethernet address to be 0xFFFFFFFF (this is an Ethernet standard). Under this approach, all packets 111 reach all physical servers 207, but only packets with matching fence and installation identifiers are sent to the appropriate virtual network 117, and hence to the relevant virtual machines 105.

An advantage of this approach is that the packet 111 level processing is minimal. On the transmission path, a header 209 is prepended to the packet 111, and sent to the physical network device 113. On the receive path, the host identifier and fence identifier are examined, the header 209 is removed, and the payload is sent to the appropriate virtual machine(s) 105.

A disadvantage of broadcasting is that it saturates the physical network 119 with packets 111 which will have to be filtered by all physical hosts 207, incurring a performance hit. Broadcast packets 111 not only reach physical servers 207, but also reach all virtual machines 105 in bridged mode, which further degrades performance.

Another switching option is multiple unicast, in which the host level virtual network device 101 maintains a list 211 of which physical servers 207 contain virtual machines 105 deployed in the various fenced configurations 203 (identified, e.g., by fence identifier). Upon receiving a packet 111 for transmission, the host level device 101 reads the list 211 to determine the relevant target physical servers 207, and sends the packet 111 only to these physical servers 207, one server 207 at a time. The receive-end processing is identical to that of full broadcast. An example of such a list 211 is depicted in Table 2. It is to be understood Table 2 depicts a specific example only, and that substantially similar or equivalent information can of course be stored in other formats and/or data structures.

TABLE 2

| Fence ID | MAC address of Hosts |
|---|---|
| 1 | AA:BB:CC:DD:EE:FF, BB:CC:DD:EE:FF:AA |
| 2 | CC:DD:EE:FF:AA:BB |
| 3 | CC:DD:EE:FF:AA:BB, DD:EE:FF:AA:BB:CC, EE:FF:AA:BB:CC:DD |

In such an embodiment, each host level virtual network device 101 maintains such information 211 (e.g., a list 211 of configurations 203 and the MAC addresses of physical servers 207 with virtual machines 105 deployed therein). A management layer can provide the host level virtual network devices 101 with the initial lists 211, and optionally keep the lists current in real time.

Under multiple unicast, packet 111 processing on the transmission path is more expensive because it involves reading the list 211 and sending the packets 111 one by one. However, such limited broadcast has the advantage that only physical servers 207 with virtual machines 105 in a specific fenced configuration 203 need to process those packets 111. As opposed to full broadcast, physical servers 207 without virtual machines 105 in the fenced configuration 203 need not use cycles processing packets 111 not intended for them. However, all physical servers 207 participating in the specific fenced configuration 203 still receive all network packets 111 concerning that fenced configuration 203.

A multicast solution is similar to limited broadcast. Instead of maintaining a physical server list 211 on a per configuration 203 basis, a multicast address/port 213 is assigned to a fence identifier. All physical hosts 207 involved in the corresponding fenced configuration 203 listen to the multicast address 213. Table 3 depicts an example.

TABLE 3

| Fence ID | Multicast Address |
|---|---|
| 1 | XX |
| 2 | YY |
| 3 | ZZ |

Another way of implementing multicast is to encapsulate packets 111 using IP rather than just using raw Ethernet. This allows usage of the multicast capability of IP to send the encapsulated packets 111 to the correct physical servers 207 in addition to allowing physical servers 207 hosting the virtual machines 105 to run on different Ethernet segments.

Advantages of multicast over limited broadcast are that a single multicast address 213 is maintained per fenced configuration 203, as opposed to maintaining a list 211, and that the transmission path processing is minimal. Disadvantages of using multicast are that it is not well supported in some networking equipment, and it can be necessary to reserve a large range of multicast addresses 213 for such use.

Another approach is unicast. In the unicast approach, instead of delivering all packets 111 from virtual machines 105 to all physical hosts 207 with one or more virtual machines 105 in a particular fenced configuration 203, packets 111 are sent only to the physical server 207 with the target virtual machine 105. In this case, only one physical host 207 receives the packet 111 for processing.

To implement this approach, each host level virtual network device 101 maintains a hash table 215 on a per configuration 203 basis, that maps the MAC address of specific virtual machines 105 to the MAC addresses of the physical server 207 on which the specific virtual machine 105 is deployed. This table 215 can be populated by the management layer during virtual machine 105 deployment, and can be maintained thereby in real time.

When transmitting a packet 111, a host level virtual network device 101 inspects the outgoing packet 111 and determines the MAC address of the destination virtual machine 105. It then looks up the MAC address of the physical server 207 on which the destination virtual machine 105 runs, and uses that as the destination address of the header 209. A sample hash table 215 is depicted by Table 4. Of course, virtual machine 105 and corresponding physical host 207 MAC addresses can be associated in other formats as desired.

TABLE 4

| Destination VM MAC address | Physical server MAC address |
|---|---|
| VM Mac 1 | Physical Mac 2 |
| VM Mac 2 | Physical Mac 2 |
| VN Mac 3 | Physical Mac 3 |

Table 5 depicts an example of a packet 111 constructed during such a send operation.

TABLE 5

| Header | | | | Standard Ethernet Frame from VM | | | |
|---|---|---|---|---|---|---|---|
| 6 Bytes DA2 | 6 Bytes SA2 | 2 Bytes T/L 2 | 2 Bytes FragHeader | 6 Bytes DA1 | 6 Bytes SA1 | 2 bytes T/L 1 | N bytes Payload |

Associated processing logic according to one embodiment is depicted in Table 6. All tables depicting processing logic are examples only; possible variations will be readily apparent to those of ordinary skill in the relevant art in light of this specification, and are within the scope of the present invention.

TABLE 6

```
Attach header
If (DA1 == broadcast) {
    DA2 = broadcast
} else if (DA1 == multicast) {
    DA2 = broadcast
} else { // Unicast
    DA2 = Lookup (DA1)
}
SA2 = Source MAC Address
T/L2 = Type Length
Transmit packet
```

An advantage of using unicast is that minimal traffic 107 is transmitted on the physical network 119, and only the host 207 of the virtual machine 105 for which a packet 111 is intended receives and processes that packet 111. A disadvantage of using unicast is that the transmission path processing is significantly more expensive as it involves a hash table 215 look up.

Figure 3:
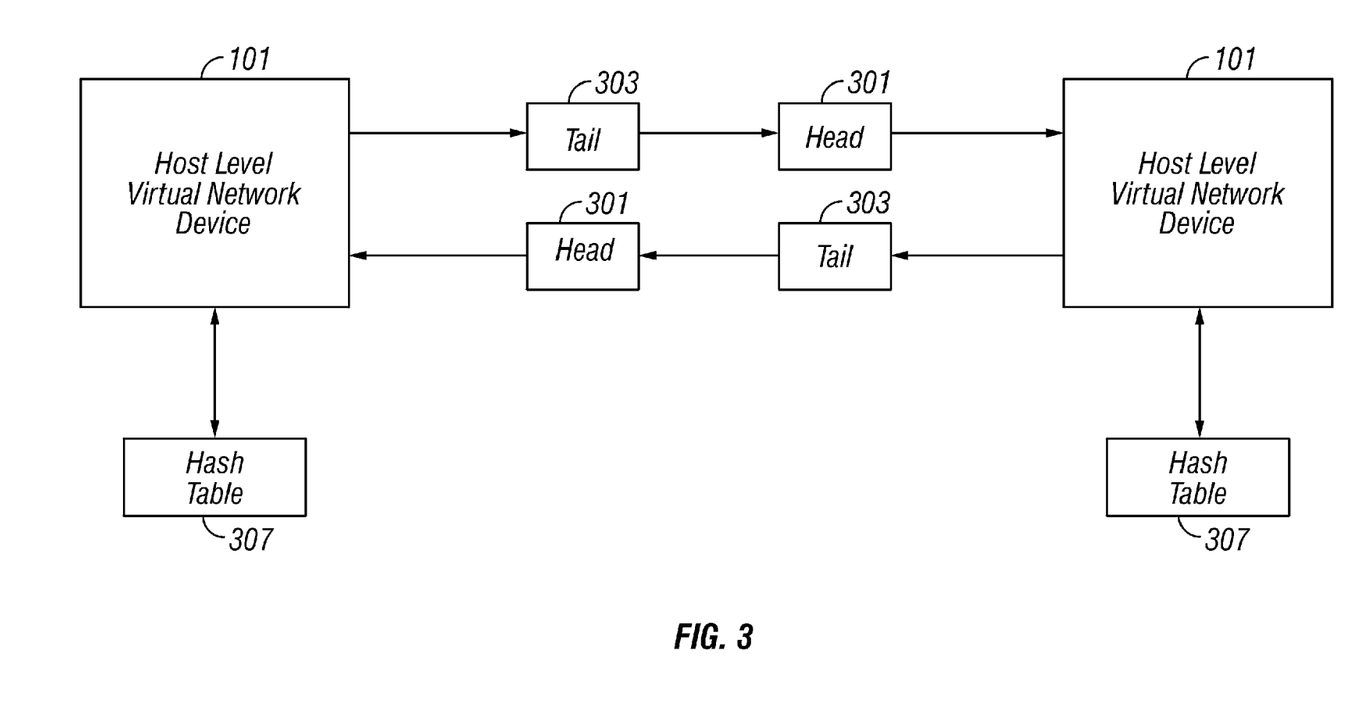
FIG. 3 is a block diagram illustrating a high level overview of packet fragmentation, according to some embodiments of the present invention.

Turning now to FIG. 3, an issue of which to be mindful in the context of the present invention is that a packet 111 comprises the unit of data passed across the interface between the Internet Protocol layer and the Ethernet layer, and includes the Internet protocol (IP) header and data. This is commonly referred to as the Maximum Transmission Unit (MTU). The Ethernet MTU is defined to be 1500 bytes. Since Ethernet adds a 14 byte. MAC header and a four byte link-layer cyclical redundancy check (CRC), the largest possible Ethernet frame is 1518 bytes.

Virtual machines 105 adhere to this standard, hence the maximum packet size sent from a virtual machine 105 is 1500 bytes. With the 16-byte header 111 added by the host level virtual network device 101 to each outgoing packet 111 for fenced virtual machines 105, packets larger than 1484 bytes will exceed the maximum Ethernet packet size, and cannot be transmitted by the physical device 113.

To address this, host-level virtual network devices 101 fragment packets 111 larger than 1484 bytes into smaller packets 111, and reassemble the smaller packets 111 on the receiving end. In one embodiment, the host-level virtual network device 101 divides each large packet 111 into two fragments, a first fragment (head 301) and a second fragment (tail 303) (in other embodiments packets 111 are split into more than two segments). The host-level virtual network device 101 sends the head 301 and the tail 303 in sequence. The virtual device 101 relies on the fact that packets 111 from a single Ethernet transmission are received in order; hence the head 301 can be expected to be received before the tail 303. The sending host-level virtual network device 101 can set flags in the fragmentation portion of the header 209 to indicate whether the packet 111 is part of a fragmented packet 111, and if so, whether it is the head 301 or the tail 303.

The sending host-level virtual network device 101 can also write a sequence number to the fragmentation portion of the header 207, the sequence number being used by the receiving host-level virtual network device 101 to associate the two fragments 301, 303. Once the receiving host-level virtual network device 101 receives a head fragment 301, it expects the next packet to be a tail 303 with the same sequence number. If this is the case, the receiving virtual network device 101 reassembles the fragments 301, 303 into the original packet 111 and passes it upstream. If any of the following errors occur, the receiving virtual network device 101 notes that one or more packets 111 were lost during the Ethernet transmission: 1) the virtual device 101 receives a head 301, but then receives a non fragmented packet 111 or another head 301—this indicates that the tail 303 was lost (and possibly more packets 111); 2) the virtual device 101 receives a tail 303 without having first received the corresponding head 301—this indicates that the head 301 was lost (and possibly more packets 111); and 3) the virtual device 101 receives a head 301 and tail 303 with different sequence numbers—this indicates that a tail 303 and a head 301 were lost (and possibly more packets 111 in between). In the case of any of these error conditions, the receiving virtual device 101 discards the incomplete packet 111, and expects higher layer protocols to trigger a retransmission.

On the receive path, the virtual network device 101 keeps track of whether the last packet 111 it received from a particular host 207 was a head fragment 301. It can do this, for example, via a hash table 307, keyed by the sending host 207, which is indexed to store packets 111 from each receiving host-level virtual network device 101. Of course, such information can be tracked in other formats as desired.

Table 7 depicts an example of a packet 111 including the fragmentation portion of the header 207, according to some embodiments of the present invention.

TABLE 7

| Header | Fragmentation Section of Header | | | | Standard Ethernet Frame |
|---|---|---|---|---|---|
| 14 Bytes | 4 Bits Version | 2 Bits Flags | 2 Bits Reserved | 8 Bits Sequence # | VM Ethernet Packet |

Tables 8-11 depict examples of MTU processing logic according to one example of the present invention.

TABLE 8

Transmission Path Processing

```
send(pkt) {
    If ( pkt.size <= MTU threshold ) {
        Pkt.fragflag = not_fragmented
        Transmit (pkt); // fast path
    } else {
        // split pkt into two packets (pkt1, pkt2)
        Pkt1.fragflag = head
        Pkt2.fragflag = tail
        Pk1.data = pkt.data[1, 1498]
        Pkt2.data = pkt.data[1499, pkt.size]
        Pkt1.seq = seq
        Pkt2.seq = seg;
        Seq = (seq + 1) mod 256
        Transmit (pkt1)
        Transmit (pkt2)
    }
}
```

TABLE 9

Transmission Path Processing

```
send(pkt) {
    If ( pkt.size <= MTU threshold ) {
        Transmit (pkt); // fast path
    } else {
        // split pkt into two packets (pkt1, pkt2)
        Pkt1.fragflag = first_fragement
        Pkt2.fragflag = second_fragement
        Pk1.data = pkt.data[1, MTU]
        Pkt2.data = pkt.data[MTU +1, pkt.size]
        Pkt1.seq = seq
        Pkt2.seq = seq;
        Seq = mod(seq + 1, 256)
        Transmit (pkt1)
        Transmit (pkt2)
    }
}
```

TABLE 10

Receive Path Processing

```
recv(pkt) {
    If (not_fragmented) {
        Process(pkt); // fast path
    } else {
        SA = SourceHostID(pkt)
        If (head fragment) {
            Clear(Hash[SA])
            Hash[SA].seq = seq#
            Hash[SA].pkt = pkt
        } else if (tail fragment)
            If ( Hash[SA] .seq == seq) {
                Newpkt = Join(hash[SA].pkt, pkt)
                Process (newpkt)
                Clear(Hash[SA])
            } else {
                Drop(pkt)
                Clear(Hash[SA])
            }
        } else {
            Drop(pkt)
            Clear(Hash[SA])
        }
    }
}
```

TABLE 11

Receive Path Processing

```
recv(pkt) {
    If ( FragBit is not set) {
        Process(pkt); // fast path
    } else {
        If (first fragment) {
            Hash[SA].seq = seq#
            Hash[SA].pkt = pkt
        } else if (second fragment)
            If ( Hash[SA].seq == seq) {
                Newpkt = Join(hash[SA].pkt, pkt)
                Process (newpkt)
            } else {
                Drop(pkt)
                Drop(Hash[SA].pkt)
            }
        } else {
            Drop(pkt)
        }
    }
}
```

For large file transfers, most packets 111 sent by virtual machines 105 will be 1500 bytes, and thus many fragmented packets 111 will be generated. While this is functionally correct, it is desirable to avoid this situation where practicable for better performance. To address this, users can set the MTU in the guest operating system 109 to a lower value so that fragmentation does not occur.

For example, for Linux the MTU can be set on the Ethernet interface level. In this case, the MTU should be set to 1500−16=1484. For Windows, the MTU can be set at the IP level. The IP header is 20 bytes, thus the MTU should be set to 1500−16−20=1464. This will only be adhered to by protocols in the stack that are layered above IP. Any protocols that are layered directly over Ethernet and send large packets (greater than 1484 bytes) will have their packets fragmented.

Of course, the 1500 byte Ethernet frame limit is a convention. Should that standard change, the methodology described above can be applied to constants other than 1500.

Figure 4:
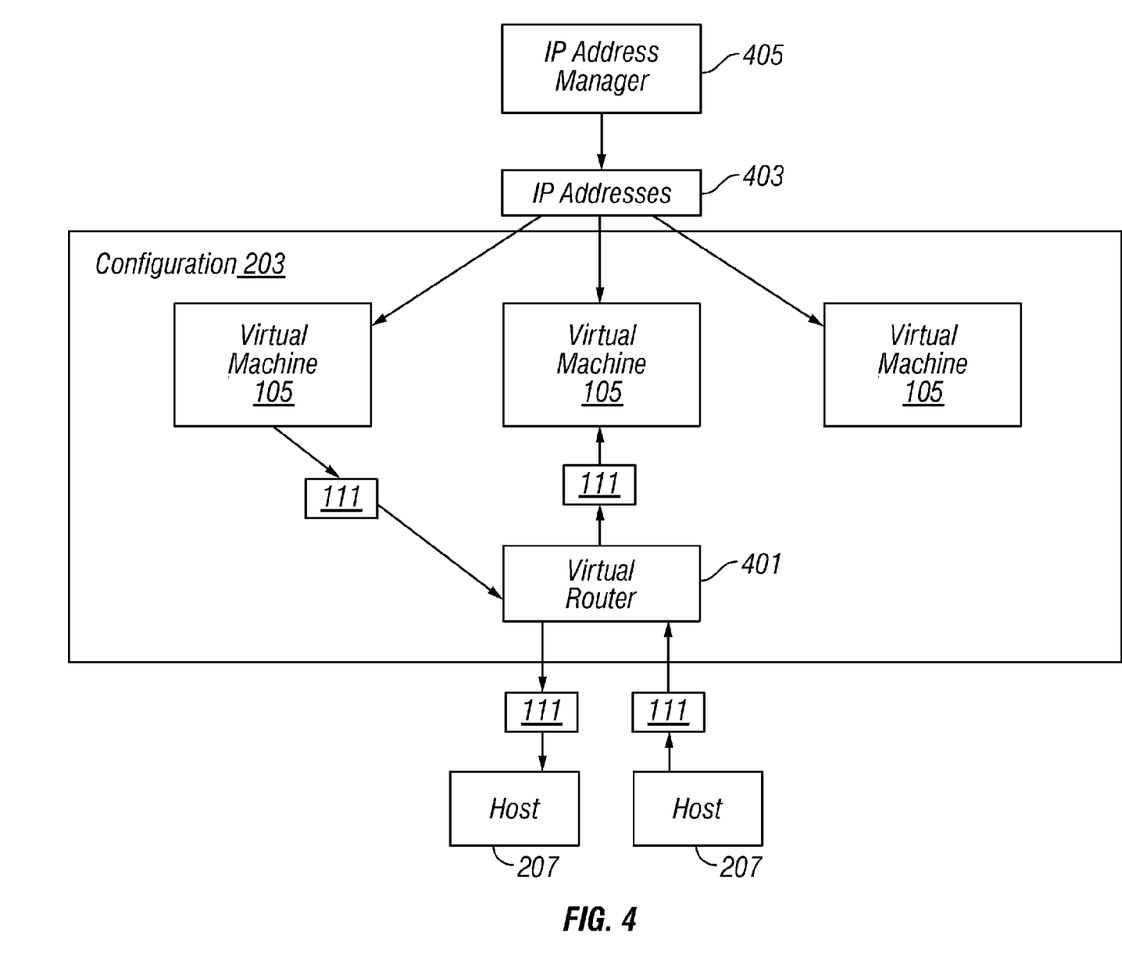
FIG. 4 is a block diagram illustrating a high level overview of the operation of virtual routing, according to some embodiments of the present invention.

Turning now to FIG. 4, a virtual router 401 enables NAT communication for virtual machines 105 in a fenced configuration 203, thereby allowing external access. An issue of which to be mindful in this context is IP address management 403. To this end, an IP address manager 405 can be utilized. For present purposes, this description assumes that only one subnet is used. Managing multiple IP subnets will be discussed below.

The end user (e.g., a system administrator or the like) can enter a range of IP addresses 403 to be managed, this set of IP addresses 403 being on the same subnet as the physical servers 207 on the physical network 217. The IP address manager 405 assigns IP addresses 403 to virtual machines 105 during virtual machine 105 creation. Additional IP addresses 403 are assigned during deployment of a fenced configuration 203. The IP address manager 405 releases IP addresses 403 when a virtual machine 105 is deleted, or when a virtual machine 105 in fenced mode is un-deployed. Table 12 depicts an example of relevant network address information according to one embodiment of the present invention. The discussion below uses the example values of Table 12, but of course other values can be used.

TABLE 12

| Parameter | Value |
| --- | --- |
| Network | 10.6.0.1-10.6.255.255 |
| Netmask | 255.255.0.0 |
| Default gateway | 10.6.0.1 |

The virtual router 401 routes traffic 107 between the fenced configuration 203 and external components, so that a fenced configuration 203 can communicate with the native network 119, and with the outside world generally. It is to be understood that although the virtual router 401 is illustrated as a single entity, as the term is used herein a virtual router 401 refers to a collection of functionalities which can be implemented in a variety of ways. In one embodiment, the virtual router 401 is implemented as a virtual machine 105. This option is quite functional, as complex operating systems such as Linux already have advanced routing capability built-in, and a (typically scaled-down) version of that can be used as the virtual router 401. However, such an implementation is typically slow, as running a full fledged virtual machine 105 is computationally expensive.

In another embodiment the virtual router 401 is implemented as a user level process. The user level process can open raw sockets on interfaces using techniques similar to those employed by network monitoring utilities such as tcpdump (libpcap and IP divert) and Ethereal. The user level process can thus implement the routing logic. This is less computationally expensive than running a virtual machine 105, but is more labor intensive to build, as it needs either to implement the routing stack, or port same from an existing kernel.

In another embodiment, the virtual router 401 is implemented as a kernel module. A kernel module can be written to perform routing functionality similar to the user level process, and is more efficient, as it avoids buffer copies between user space and the kernel, and eliminates context switches. However, a kernel level router is more complex to implement, and is considerably more labor intensive to debug.

Under some operating systems, a virtual router 401 can also be implemented as configuration of the existing kernel stack. Some kernels are written such that the networking stack is virtualizable, but this is not the case for kernels of some operating systems, such Windows Server 2003.

The fencing of configurations 203 can be executed in a variety of ways, the choice of which informs the IP address 403 management and routing logic. In deploy time fencing (DTF), when a configuration 203 with multiple virtual machines 105 is created, the virtual machines 105 are assigned available IP addresses 403, e.g., 10.6.1.1 and 10.6.1.2. When the virtual machines 105 are deployed in non-fenced mode, they use the assigned IP addresses 403 directly.

If the configuration 203 is subsequently cloned, each clone virtual machine 105 in the new configuration 203 maintains the MAC address and IP address 403 of the original virtual machine 105. The cloned configuration 203 cannot be deployed in non-fenced mode, as doing so would cause address conflicts with the deployed original configuration 203. Hence, the new configuration 203 is deployed in fenced mode.

The host level virtual network device 101 guarantees that network traffic 107 is isolated within a fence. However, as noted above it is desirable for virtual machines 105 inside the fence to be able to access network services outside the fence, which is where the virtual router 401 comes in. It is further desirable that a virtual machine 105 be unmodified when deployed in fenced mode, and that it be able to communicate with the gateway with which it was configured (e.g., 10.6.0.1). To these ends, the internal interface of the virtual router 401 can be configured with proxy address resolution protocol (ARP) for 10.6.x.x network. This means that when a virtual machine 105 asks for the MAC address of a machine in the 10.6.x.x network outside the fence, the virtual router 401 acts as a proxy and advertises that it has the MAC address. This causes packets 111 targeted to those addresses to be routed through the virtual router 401.

More specifically, proxy ARP is a technique in which one host, usually a router, answers ARP requests intended for another machine. By "faking" its identity, the router accepts responsibility for routing packets to the "real" destination. Proxy ARP can help machines on a subnet reach remote subnets without configuring routing or a default gateway. Proxy ARP is known to those of ordinary skill in the relevant art. The implementation mechanics of proxy ARP within the context of the present invention will be readily apparent to those of ordinary skill in the relevant art in light of this specification. Through the use of proxy ARP, virtual machines 105 inside a fenced configuration are able to communicate with the gateway, as well as with other virtual machines 105 outside the fence in the 10.6.x.x network.

Since multiple identical fenced configurations 203 can be active at the same time, the virtual router 401 performs network address translation on connections originating from inside a fence such that the virtual router's 401 IP address 403 is used instead. Additionally, NAT translation is performed on protocols that require an extra connection to be made from a server, for example, FTP and PPTP. This is similar to having multiple computers on a home network behind a NAT firewall.

Sometimes it is desirable to make a connection from outside the fence to a virtual machine 105 inside the fenced configuration 203. A virtual machine 105 inside the fence cannot be addressed directly by its assigned IP address 403, because there could be multiple virtual machines 105 with the same IP address 403 deployed at the same time. Thus, under DTF, unique IP addresses 403 are allocated at deployment time for each of the virtual machines 105, and a 1:1 NAT is performed to map an external address 403 to an assigned address 403 for a virtual machine 105. Programs external to the fence can use the external address 403 to access virtual machines 105 in the fenced configuration 203.

An example routing configuration under DTF according to some embodiments of the present invention is depicted in Table 13.

TABLE 13

| Routing configuration |
| --- |
| Network Interfaces |

1: lo: <LOOPBACK,UP> mtu 16436 qdisc noqueue
    link/loopback 00:00:00:00:00:00 brd 00:00:00:00:00:00
    inet 127.0.0.1/8 scope host lo TABLE 13-continued Routing configuration 2: eth0: <BROADCAST,MULTICAST,UP> mtu 1500 qdisc pfifo_fast qlen 1000
    link/ether 00:03:ff:0b:01:03 brd ff:ff:ff:ff:ff:ff
    inet 10.6.11.134/16 brd 10.255.255.255 scope global eth0
    inet 10.6.11.132/32 scope global eth0
    inet 10.6.11.133/32 scope global eth0
3: eth1: <BROADCAST,MULTICAST,UP> mtu 1500 qdisc pfifo_fast qlen 1000
    link/ether 00:03:ff:0b:01:04 brd ff:ff:ff:ff:ff:ff
    inet 10.6.11.135/16 brd 10.255.255.255 scope global eth1

Kernel IP routing table

| Destination | Gateway | Genmask | Flags | MSS | Window | irtt | Iface |
|---|---|---|---|---|---|---|---|
| 10.6.11.131 | 0.0.0.0 | 255.255.255.255 | UH | 0 | 0 | 0 | eth1 |
| 10.6.11.130 | 0.0.0.0 | 255.255.255.255 | UH | 0 | 0 | 0 | eth1 |
| 10.6.0.0 | 0.0.0.0 | 255.255.0.0 | U | 0 | 0 | 0 | eth0 |
| 0.0.0.0 | 10.6.0.1 | 0.0.0.0 | UG | 0 | 0 | 0 | eth0 |

IP Chains
Chain PREROUTING (policy ACCEPT 16289 packets, 2299K bytes)

| pkts | bytes | target | prot | opt | in | out | source | destination |
|---|---|---|---|---|---|---|---|---|
| 0 | 0 | DNAT to:10.6.11.130 | all | — | eth0 | * | 0.0.0.0/0 | 10.6.11.132 |
| 0 | 0 | DNAT to:10.6.11.131 | all | — | eth0 | * | 0.0.0.0/0 | 10.6.11.133 |

Chain POSTROUTING (policy ACCEPT 0 packets, 0 bytes)

| pkts | bytes | target | prot | opt | in | out | source | destination |
|---|---|---|---|---|---|---|---|---|
| 0 | 0 | SNAT to:10.6.11.133 | all | — | * | eth0 | 10.6.11.131 | 0.0.0.0/0 |
| 181 | 15154 | SNAT to:10.6.11.132 | all | — | * | eth0 | 10.6.11.130 | 0.0.0.0/0 |
| 2214 | 186K | SNAT to:10.6.11.134 | all | — | * | eth0 | 0.0.0.0/0 | 0.0.0.0/0 |

Chain OUTPUT (policy ACCEPT 2214 packets, 186K bytes)

| pkts | bytes | target | prot | opt | in | out | source | destination |
|---|---|---|---|---|---|---|---|---|

Another fencing option is creation time fencing (CTF). Unlike DTF where the decision of whether to fence or not is made when a configuration 203 is deployed, under CTF the decision is made when a configuration 203 is created. After creation, the configuration 203 can only be deployed in fenced mode.

At first glance, it is unintuitive to make such a limitation imposing decision in advance when it can be postponed under DTF. However, there are reasons why CTF can be preferable, and thus is supported in some embodiments of the present invention.

On reason is IP address 403 consumption. Each virtual machine 105 in DTF consumes a unique IP address 403 from the limited set in the managed pool. Under CTF it is known that virtual machines 105 will be deployed in a fenced configuration 203, so IP addresses 403 can be reused for virtual machines 105. In other words, a specific set of IP addresses 403 (such as 192.168.77.1-1921.68.77.255) can always be used for virtual machines 105 under CTF. Because CTF is much more efficient in IP address 403 usage, it can be preferable in a situation where IP address 403 resources are scarce, for example in a hosted demonstration environment.

Another situation to consider is imported configurations. When a configuration 203 is ported from one site to another, the configuration 203 is unlikely to be deployable in non-fenced mode, because the IP network settings for different sites are likely to be different. In such a scenario, the configuration 203 can only be deployed in fenced mode, and thus CTF poses no disadvantages to DTF.

The virtual router 401 configuration under CTF is similar to that under DTF, except that under CTF virtual machines 105 in a fenced configuration 203 do not expect the gateway address to be the default, due to underlying network differences. In this case, the virtual router 401 assumes the IP address 403 of the gateway for the virtual machines 105 on the interface inside the fence.

Another fencing possibility according to some embodiments of the present invention is runtime fencing (RTF). Under RTF, a configuration originally 203 deployed in non-fenced mode can be contained within a fence at run time. This is useful when, for example, a network problem is found, and it is desirable to contain network traffic 107 of a specific configuration 203 without shutting down all the virtual machines 105. Fencing a configuration 203 at run time is transparent to running virtual machines 105, as their operations are not interrupted. A deployed configuration 203 can be fenced at run time by injecting the host level virtual network device 101 so as to associate a fence identifier with the configuration 203.

Some embodiments of the present invention also support run time un-fencing. To implement run time un-fencing, the fencing encapsulation is taken away from a configuration 203 deployed in fenced mode, such that the configuration 203 appears on the native network 119.

Another issue of which to be mindful in the implementation of various embodiments of the present invention is address resolution protocol (ARP). When a virtual machine 105 is deployed in non-fenced mode, the ARP cache of the virtual machine 105 maps the IP address 403 of the gateway to the MAC address of the underlying physical gateway. Therefore, when such a virtual machine 105 is redeployed in fenced mode, the MAC address needs to be updated to match that of the internal interface of the virtual router 401. However, the ARP cache timeout for certain operating systems can be up to 20 minutes, and until the cached ARP entry for the gateway times out, the redeployed virtual machine 105 does not have external connectivity.

The ARP timeout value is usually configurable for an operating system. In order to address this issue, the value can be reset to a short period of time. Gratuitous ARP is an ARP standard according to which a host can make an ARP request for itself, such that other hosts on the network will update their ARP caches as well. In one embodiment, a small utility is used to periodically send out a gratuitous ARP packet (not illustrated) so that virtual machines 105 inside a fence update their ARP cache. In the ARP request packet the source IP address 403 and destination IP address 403 can both be set to the same source IP address 403 to use, and the destination MAC address can be set to the Ethernet broadcast address (FF:FF:FF:FF:FF:FF).

As an alternative to addressing the ARP issue with gratuitous ARP, a Software Configuration Management system can proactively resolve the MAC address of the gateway and store it with the configuration 403. When the configuration 403 is redeployed in fenced mode, the virtual router 401 is configured with this MAC address on the internal interface. This avoids the ARP timeout issue, at the expense of additional configuration by the SCM system.

The specification up to this point describes running the entire system on a single physical network 119. However, in a server farm environment it is not uncommon that a class C network 119 is insufficient for all the physical servers 207, virtual machines 105 and external addresses 403 used in fence mode. Many users do not wish to allocate a large network 119 upfront, but instead prefer to grow the deployment over time. It is thus desirable to employ a strategy that allows a user to start with a small class C network 119, and add additional class C networks 119 over time. Hence, some embodiments of the present invention support managing multiple subnets.

In such embodiments, the management layer of the system keeps track of different physical segments 119, IP subnets attached to these segments 119, their IP addresses 403, physical servers 207 and their corresponding physical segments 119. When a virtual machine 105 is created, the user decides with which segment 119 to associate the virtual machine 105, and allocates a free IP address 403 from that segment 119 to that virtual machine 105. All virtual machines 105 in the same configuration 203 are deployed on physical servers 207 connected the same physical segment 119 to reduce traffic 107 going across routers connecting the multiple networks 119. When a virtual machine 105 is deployed in native or DTF mode, only physical servers 207 with corresponding physical network segments 119 are selected. When a virtual machine 105 is deployed in CTF mode (because the native network ran out of IP addresses 403), only physical servers 207 outside of the native network segment 119 are selected.

In some embodiments of the present invention, instead of having a flat topology for all virtual machines 105 in the same configuration 203, multiple virtual machines 105, distributed switches 201 and virtual routers 401 can be inter-connected to form a large and complex virtual network 117. In such embodiments, virtual machines 105 can be configured to have multiple host level virtual network devices 101, multiple host level virtual network devices 101 can be mapped to fenced configurations 203, fenced configurations 203 can be joined by virtual routers 401, proper routing rules can be sent with BGP, ISIS, or RIP, and firewalls can be placed between different subnets 119. In such embodiments, multiple-tier applications with non-trivial network topology can be built all within a server farm environment, without the need for any physical configuration.

This virtual network topology utilizes virtualization technology in a server farm environment, allowing multiple virtual machines 105 to be interconnected with host level virtual network devices 101 and virtual switches 201, and constructs a virtual network 117 overlaying on one or more physical network segment(s) 119. Applications for this technology include but are not limited to: client/server testing, capturing a known configuration and redeploying it multiple times, replicating demonstration environments for sales and training, parallel execution of identical environments such as parallel build systems, protocol development and testing for layer three or above networking protocols, and testing complex deployment scenarios with multiple networks and firewalls.

It is to be understood that although the above description describes embodiments of the present invention within the context of an Ethernet environment, the present invention can also be instantiated within other networking contexts and environments.

As will be understood by those familiar with the art, the invention may be embodied in other specific forms without departing from the spirit or essential characteristics thereof. Likewise, the particular naming and division of the modules, agents, managers, devices, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, devices, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for managing virtual networks, the method comprising the steps of:

maintaining a fenced configuration of virtual machines deployed on a plurality of physical servers, wherein the fenced configuration is a logical group of virtual machines that reside on the plurality of physical servers, the logical group in which the virtual machines are network isolated from other virtual machines that are not a part of the logical group, the plurality of physical servers being communicatively coupled in a private network, the private network is connected to an external network through a network gateway;

intercepting a plurality of outbound packets from a first virtual machine that resides on a first physical server in the plurality of physical servers, the plurality of outbound packets being destined for a second virtual machine that resides on a second physical server in the plurality of physical servers; and determining if the first virtual machine and the second virtual machine are a part of the fenced configuration, wherein if the first virtual machine and the second virtual machine are a part of the fenced configuration, transmitting each of the plurality of outbound packets at least to the second physical server on which the second virtual machine is deployed, wherein the second physical server further transmits the plurality of outbound packets to the second virtual machine;

wherein if the first virtual machine is a part of the fenced configuration and the second virtual machine is not a part of the fenced configuration, dropping the plurality of outbound packets.

2. The method of claim 1 further comprising routing network traffic between virtual machines of the fenced configuration and components of the external network, wherein the routing network traffic being enabling an exchange of data packets between a virtual machine in the fenced configuration and the components of the external network, through the network gateway.

3. The method of claim 1, wherein the determining includes checking a fence identifier that is added to a packet header of each of the plurality of outbound packets, wherein the fenced configuration is assigned a unique fence identifier.

4. The method of claim 1 further comprising:
a host level virtual network device receiving packets from a physical network device intended for virtual machines deployed in a fenced configuration on a physical server;
the host level virtual network device un-encapsulating the received packets for transmission to target virtual machines deployed in the fenced configuration on the physical server; and
the host level virtual network device transmitting the un-encapsulated packets to a virtual network for distribution to the target virtual machines deployed in the fenced configuration on the physical server.

5. The method of claim 1 wherein transmitting each of the plurality of outbound packets to at least to the second physical server, further comprises transmitting the plurality of outbound packets to every physical server on the network.

6. The method of claim 1 wherein transmitting each of the plurality of outbound packets at least to the second physical server, further comprises:
maintaining a record of on which of the plurality of physical servers, virtual machines of the fenced configuration are deployed; and
transmitting the plurality of outbound packets to physical servers on which virtual machines are deployed in a same fenced configuration as the first virtual machine.

7. The method of claim 1 wherein transmitting each of the plurality of outbound packets at least the second physical server, further comprises:
maintaining a separate multicast address for the at least one fenced configuration; and
transmitting each of the plurality of outbound packets to a multicast address for the fenced configuration in which the first virtual machine is deployed.

8. The method of claim 1 wherein transmitting each of the plurality of outbound packets at least to the second physical server, further comprises:
maintaining a mapping between virtual machine addresses and physical server addresses; and
using the mapping to transmit each of the plurality of outbound packets to the second physical server on which the second virtual machine is deployed in a same fenced configuration as the first virtual machine that sent the plurality of outbound packets.

9. The method of claim 1 further comprising creating a configuration of virtual machines.

10. The method of claim 9 further comprising deploying the configuration of virtual machines on multiple physical servers in non-fenced mode.

11. The method of claim 9 further comprising deploying the configuration of virtual machines on multiple physical servers in fenced mode.

12. The method of claim 9 further comprising:
making a copy of the configuration of virtual machines; and
deploying the copy of the configuration of virtual machines on multiple physical servers in fenced mode.

13. The method of claim 1 further comprising:
creating a fenced configuration of virtual machines; and
deploying the fenced configuration of virtual machines.

14. The method of claim 1 further comprising fencing a deployed non-fenced configuration of virtual machines.

15. The method of claim 1 further comprising un-fencing a deployed fenced configuration of virtual machines.

16. The method of claim 1 further comprising:
fragmenting the plurality of outbound packets into packet fragments; and
transmitting the packet fragments.

17. The method of claim 16 further comprising:
receiving the packet fragments; and reassembling the packet fragments into packets.

18. The method of claim 1 further comprising maintaining the fenced configuration of virtual machines deployed on the plurality of physical servers residing on a plurality of network subnets.

19. At least one computer readable non-transitory storage medium containing a computer program product for managing virtual networks, the computer program product comprising:
program code for maintaining a fenced configuration of virtual machines deployed on a plurality of physical servers, wherein the fenced configuration is a logical group of virtual machines that reside on the plurality of physical servers, the logical group in which the virtual machines are network isolated from other virtual machines that are not a part of the logical group, the plurality of physical servers being communicatively coupled in a private network, the private network is connected to an external network through a network gateway;
program code for intercepting a plurality of outbound packets network traffic from a first virtual machine that resides on a first physical server in the plurality of physical servers, the plurality of outbound packets being destined for a second virtual machine that resides on a second physical server in the plurality of physical servers; and program code for determining if the first virtual machine and the second virtual machine are a part of the at least one fenced configuration, program code for transmitting each of the plurality of outbound packets at least to the second physical server on which the second virtual machine is deployed wherein the program code for transmitting performs the transmission if the first virtual machine and the second virtual machine are a part of the at least one fenced configuration, wherein the program code for transmitting causes the second physical server further transmits the plurality of outbound packets to the second virtual machine; and program code for dropping the plurality of outbound packets if the first virtual machine is a part of the fenced configuration and the second virtual machine is not a part of the at least one fenced configuration transmitting intercepted inbound packets to locally deployed target virtual machines.

20. The computer program product of claim 19 further comprising:
   program code for routing network traffic between virtual machines of the fenced configuration and components of the external network, wherein the routing network traffic being enabling an exchange of data packets between a virtual machine in the fenced configuration and the components of the external network, through the network gateway.

21. The computer program product of claim 19 the program code for determining comprising program code for checking a fence identifier that is added to a packet header of each of the plurality of outbound packets, wherein the fenced configuration is assigned a unique fence identifier.

22. The computer program product of claim 19 further comprising:
   program code for a host level virtual network device receiving packets from a physical network device intended for virtual machines deployed in a fenced configuration on a physical server;
   program code for the host level virtual network device un-encapsulating the received packets for transmission to target virtual machines deployed in the fenced configuration on the physical server; and
   program code for the host level virtual network device transmitting the un-encapsulated packets to a virtual network for distribution to the target virtual machines deployed in the fenced configuration on the physical server.

23. The computer program product of claim 19 wherein the program code for transmitting each of the plurality of outbound packets at least to the second physical server on which the second virtual machine is deployed, further comprises program code for transmitting the plurality of outbound packets to every physical server on the network.

24. The computer program product of claim 19 wherein the program code for transmitting each of the plurality of outbound packets at least to the second physical server on which the second virtual machine is deployed, further comprises:
   program code for maintaining a record of on which of the plurality of physical servers, virtual machines of the fenced configuration are deployed; and
   program code for transmitting the plurality of outbound packets to physical servers on which virtual machines are deployed in a same fenced configuration as a virtual machine that sent the plurality of outbound packets.

25. The computer program product of claim 19 wherein the program code for transmitting each of the plurality of outbound packets at least to the second physical server on which the second virtual machine is deployed, further comprises:
   program code for maintaining a separate multicast address for the at least one fenced configuration; and
   program code for transmitting each of the plurality of outbound packets to a multicast address for the fenced configuration in which a virtual machine that sent the plurality of outbound packets is deployed.

26. The computer program product of claim 19 wherein the program code for transmitting each of the plurality of outbound packets at least to the second physical server on which the second virtual machine is deployed, further comprises:
   program code for maintaining a mapping between virtual machine addresses and physical server addresses; and
   program code for using the mapping to transmit each of the plurality of outbound packets to a physical server on which the second virtual machine is deployed.

27. The computer program product of claim 19 further comprising program code for creating a configuration of virtual machines.

28. The computer program product of claim 27 further comprising program code for deploying the configuration of virtual machines on multiple physical servers in non-fenced mode.

29. The computer program product of claim 27 further comprising program code for deploying the configuration of virtual machines on multiple physical servers in fenced mode.

30. The computer program product of claim 27 further comprising:
   program code for making a copy of the configuration of virtual machines; and
   program code for deploying the copy of the configuration of virtual machines on the plurality of physical servers in fenced mode.

31. The computer program product of claim 19 further comprising:
   program code for creating a fenced configuration of virtual machines; and
   program code for deploying the fenced configuration of virtual machines.

32. The computer program product of claim 19 further comprising program code for fencing a deployed non-fenced configuration of virtual machines.

33. The computer program product of claim 19 further comprising program code for un-fencing a deployed fenced configuration of virtual machines.

34. The computer program product of claim 19 further comprising program code for maintaining at least one fenced configuration of virtual machines deployed on multiple physical servers residing on a plurality of network subnets.

35. A computer system for managing virtual networks, the computer system comprising:
   a plurality of physical computers communicatively coupled in a private network, the private network is connected to an external network through a virtual router;
   a plurality of virtual machines deployed on the plurality of physical computers;
   a host level virtual network device executing on each of the plurality of physical computers, the host level virtual network device being configured to intercept network traffic of virtual machines deployed on the each of the plurality of physical computers;
   a fenced configuration of virtual machines deployed on the plurality of physical computers, wherein the fenced configuration is a logical group of virtual machines that reside on the plurality of physical servers in the private network, the logical group in which the virtual machines are network isolated from other virtual machines that are not a part of the logical group;

for the fenced configuration of virtual machines, a distributed virtual switch communicatively coupled to the fenced configuration of virtual machines, the distributed virtual switch being configured to switch network traffic among virtual machines deployed in the fenced configuration; and for the fenced configuration of virtual machines, the virtual router communicatively coupled to the fenced configuration of virtual machines, the virtual router being configured to route network traffic between virtual machines deployed in the fenced configuration and components of the external network, wherein the routing of the network traffic being enabling an exchange of data packets between a virtual machine in the fenced configuration and the components of the external network, wherein, the distributed virtual switch enables communication between a first virtual machine and a second virtual machine that are a part of the fenced configuration and disables communication between the first virtual machine that is a part of the fenced configuration and a third virtual machine that is not a part of the fenced configuration, wherein the first virtual machine, the second virtual machine and the third virtual machine are a part of the plurality of virtual machines.

* * * * *